(12) United States Patent
Wang et al.

(10) Patent No.: US 10,757,656 B2
(45) Date of Patent: Aug. 25, 2020

(54) LOOP INDEX AND TIME GAP FOR GROUP POWER CONTROL

(71) Applicant: QUALCOMM Incorporated, San Diego, CA (US)

(72) Inventors: Xiao Feng Wang, San Diego, CA (US); Sony Akkarakaran, Poway, CA (US); Tao Luo, San Diego, CA (US); Wanshi Chen, San Diego, CA (US); Yi Huang, San Diego, CA (US); Renqiu Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/370,405

(22) Filed: Mar. 29, 2019

(65) Prior Publication Data

US 2019/0313341 A1 Oct. 10, 2019

Related U.S. Application Data

(60) Provisional application No. 62/653,439, filed on Apr. 5, 2018.

(51) Int. Cl.
*H04W 76/27* (2018.01)
*H04W 52/12* (2009.01)
*H04W 76/11* (2018.01)
*H04L 5/00* (2006.01)
*H04W 72/12* (2009.01)

(52) U.S. Cl.
CPC ......... *H04W 52/125* (2013.01); *H04L 5/0057* (2013.01); *H04W 72/1284* (2013.01); *H04W 76/11* (2018.02); *H04W 76/27* (2018.02)

(58) Field of Classification Search
CPC ... H04W 52/125; H04W 76/11; H04W 76/27; H04W 72/1284; H04L 5/0057
USPC ..................................................... 455/522, 69
See application file for complete search history.

(56) References Cited

U.S. PATENT DOCUMENTS

| 10,425,900 | B2 * | 9/2019 | Liu ..................... H04W 72/042 |
| 10,454,650 | B2 * | 10/2019 | Kim ..................... H04W 16/28 |
| 2014/0098690 | A1 * | 4/2014 | Siomina ............... H04B 17/309 370/252 |

(Continued)

OTHER PUBLICATIONS

International Search Report and Written Opinion—PCT/US2019/025395—ISA/EPO—Jun. 17, 2019.

*Primary Examiner* — Hai V Nguyen
(74) *Attorney, Agent, or Firm* — Qualcomm Incorporated (57) ABSTRACT

Various aspects of the present disclosure generally relate to wireless communication. In some aspects, a user equipment (UE) may identify a transmit power control (TPC) command, associated with the UE, based at least in part on group power control downlink control information (DCI); and determine a loop index associated with the TPC command, wherein the loop index identifies a power control loop, of a plurality of power control loops, for the TPC command. In some aspects, the UE may apply the TPC in association with transmitting an uplink communication, wherein a time gap between receiving the group power control DCI and applying the TPC command is based at least in part on a capability value associated with the UE, or a delay value signaled to the UE. Numerous other aspects are provided.

30 Claims, 8 Drawing Sheets

(56) References Cited

U.S. PATENT DOCUMENTS

| | | | |
|---|---|---|---|
| 2014/0204919 A1* | 7/2014 | Chen | H04W 56/004 |
| | | | 370/336 |
| 2018/0041997 A1* | 2/2018 | Babaei | G06Q 20/36 |
| 2018/0092073 A1* | 3/2018 | Nogami | H04W 52/54 |
| 2018/0123744 A1* | 5/2018 | Nogami | H04L 1/1854 |
| 2018/0310257 A1* | 10/2018 | Papasakellariou | H04W 52/08 |
| 2018/0332541 A1* | 11/2018 | Liu | H04W 52/241 |
| 2018/0343096 A1* | 11/2018 | Kim | H04W 52/24 |
| 2019/0045345 A1* | 2/2019 | Lee | H04W 72/0453 |
| 2019/0191435 A1* | 6/2019 | Gao | H04W 72/0446 |
| 2019/0215781 A1* | 7/2019 | Jeon | H04W 24/10 |
| 2019/0253986 A1* | 8/2019 | Jeon | H04W 76/19 |
| 2019/0261280 A1* | 8/2019 | Jung | H04W 52/386 |
| 2019/0261281 A1* | 8/2019 | Jung | H04W 52/50 |
| 2019/0313343 A1* | 10/2019 | MolavianJazi | H04W 52/50 |
| 2019/0313348 A1* | 10/2019 | MolavianJazi | H04W 52/367 |

* cited by examiner

LOOP INDEX AND TIME GAP FOR GROUP POWER CONTROL

CROSS REFERENCE TO RELATED APPLICATION UNDER 35 U.S.C. § 119

This application claims priority to U.S. Provisional Application No. 62/653,439, filed on Apr. 5, 2018, entitled "TECHNIQUES AND APPARATUSES FOR LOOP INDEX AND TIME GAP FOR GROUP POWER CONTROL," which is hereby expressly incorporated by reference herein.

FIELD OF THE DISCLOSURE

Aspects of the present disclosure generally relate to wireless communication, and more particularly to techniques and apparatuses for loop index and time gap for group power control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a transmit power control (TPC) command, associated with the UE, based at least in part on group power control downlink control information (DCI); and determining a loop index associated with the TPC command, wherein the loop index identifies a power control loop, of a plurality of power control loops, for the TPC command.

In some aspects, a UE for wireless communication may include memory and one or more processors operatively coupled to the memory. The memory and the one or more processors may be configured to identify a TPC command, associated with the UE, based at least in part on group power control DCI; and determine a loop index associated with the TPC command, wherein the loop index identifies a power control loop, of a plurality of power control loops, for the TPC command.

In some aspects, a non-transitory computer-readable medium may store one or more instructions for wireless communication. The one or more instructions, when executed by one or more processors of a UE, may cause the one or more processors to identify a TPC command, associated with the UE, based at least in part on group power control DCI; and determine a loop index associated with the TPC command, wherein the loop index identifies a power control loop, of a plurality of power control loops, for the TPC command.

In some aspects, an apparatus for wireless communication may include means for identifying a TPC command, associated with apparatus, based at least in part on group power control DCI; and means for determining a loop index associated with the TPC command, wherein the loop index identifies a power control loop, of a plurality of power control loops, for the TPC command.

In some aspects, a method of wireless communication, performed by a UE, may include receiving group power control DCI; and applying a TPC command, identified by the group power control DCI, in association with transmitting an uplink communication, wherein a time gap between receiving the group power control DCI and applying the TPC command is based at least in part on a capability value associated with the UE, or a delay value signaled to the UE.

In some aspects, a UE for wireless communication may include memory and one or more processors operatively coupled to the memory. The memory and the one or more processors may be configured to receive group power control DCI; and apply a TPC command, identified by the group power control DCI, in association with transmitting an uplink communication, wherein a time gap between receiving the group power control DCI and applying the TPC command is based at least in part on a capability value associated with the UE, or a delay value signaled to the UE.

In some aspects, a non-transitory computer-readable medium may store one or more instructions for wireless communication. The one or more instructions, when executed by one or more processors of a UE, may cause the one or more processors to receive group power control DCI; and apply a TPC command, identified by the group power control DCI, in association with transmitting an uplink communication, wherein a time gap between receiving the group power control DCI and applying the TPC command is based at least in part on a capability value associated with the UE, or a delay value signaled to the UE.

In some aspects, an apparatus for wireless communication may include means for receiving group power control DCI; and means for applying a TPC command, identified by the group power control DCI, in association with transmitting an uplink communication, wherein a time gap between receiving the group power control DCI and applying the TPC command is based at least in part on a capability value associated with the apparatus, or a delay value signaled to the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
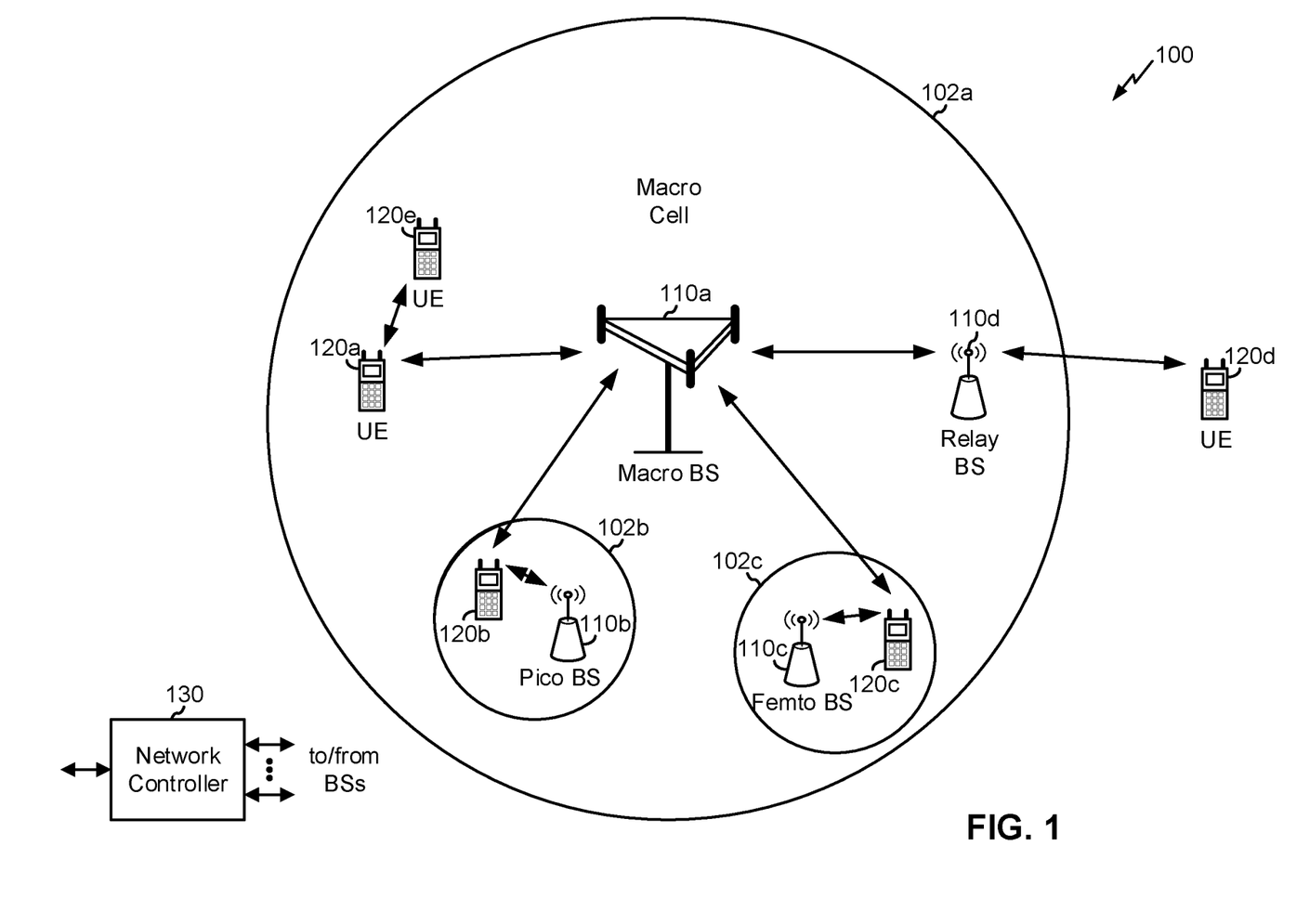
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
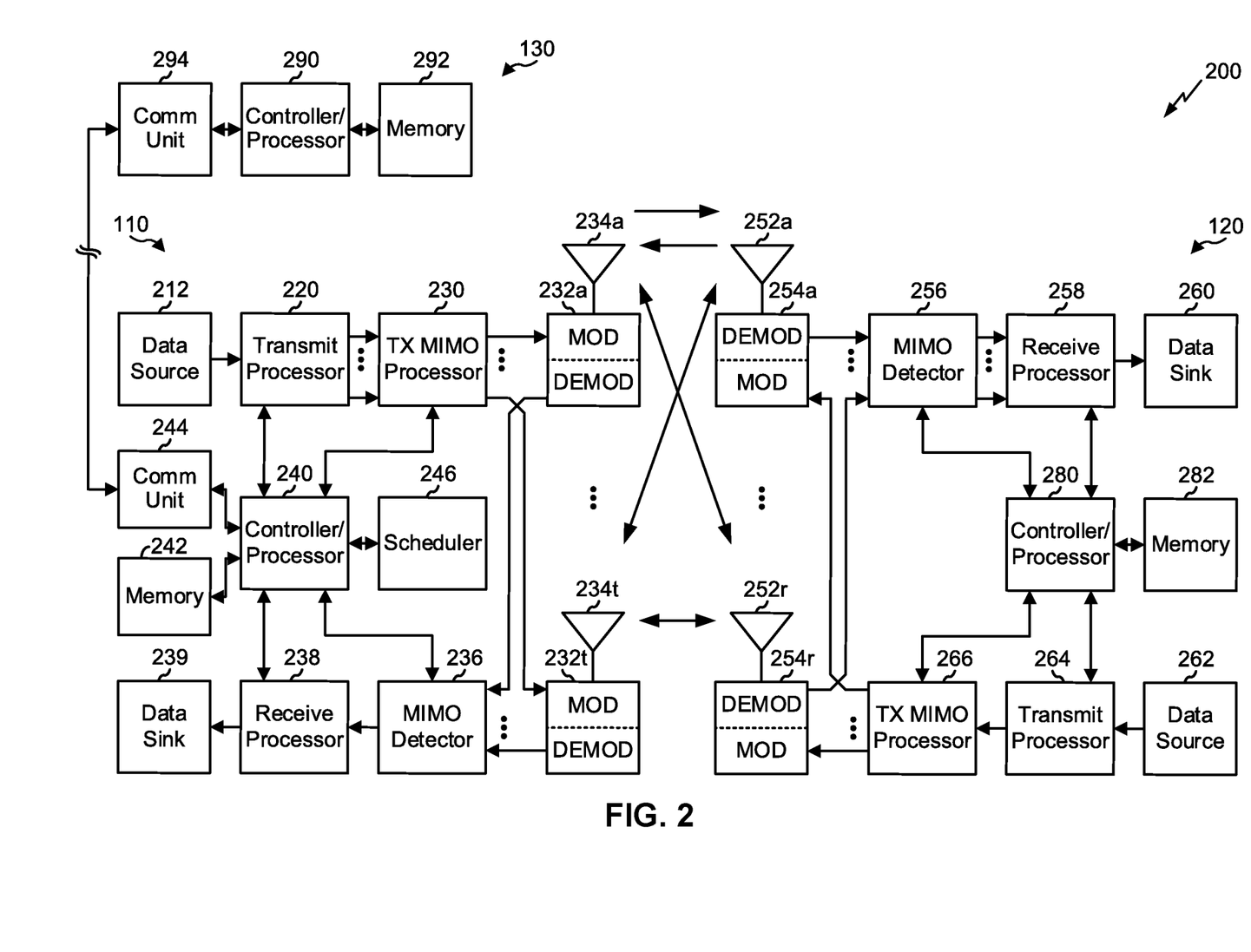
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with loop index and time gap for group power control, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying a TPC command, associated with UE 120, based at least in part on group power control DCI; means for determining a loop index associated with the TPC command, wherein the loop index identifies a power control loop, of a plurality of power control loops, for the TPC command; and/or the like. In some aspects, such means may include one or more components of UE 120 described in connection with FIG. 2.

In some aspects, UE 120 may include means for receiving group power control DCI; means for applying a TPC command, identified by the group power control DCI, in association with transmitting an uplink communication, wherein a time gap between receiving the group power control DCI and applying the TPC command is based at least in part on a capability value associated with UE 120, or a delay value signaled to UE 120; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
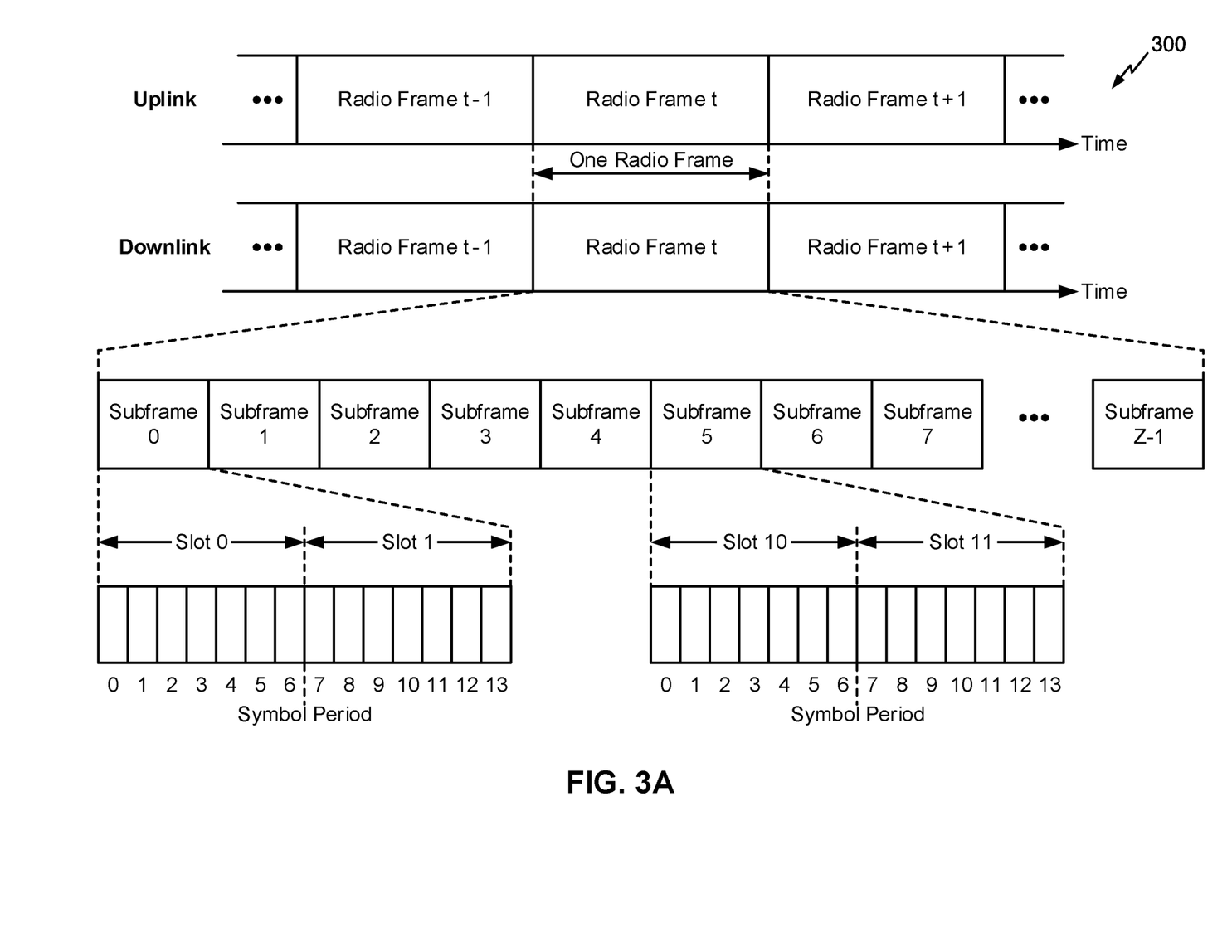
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
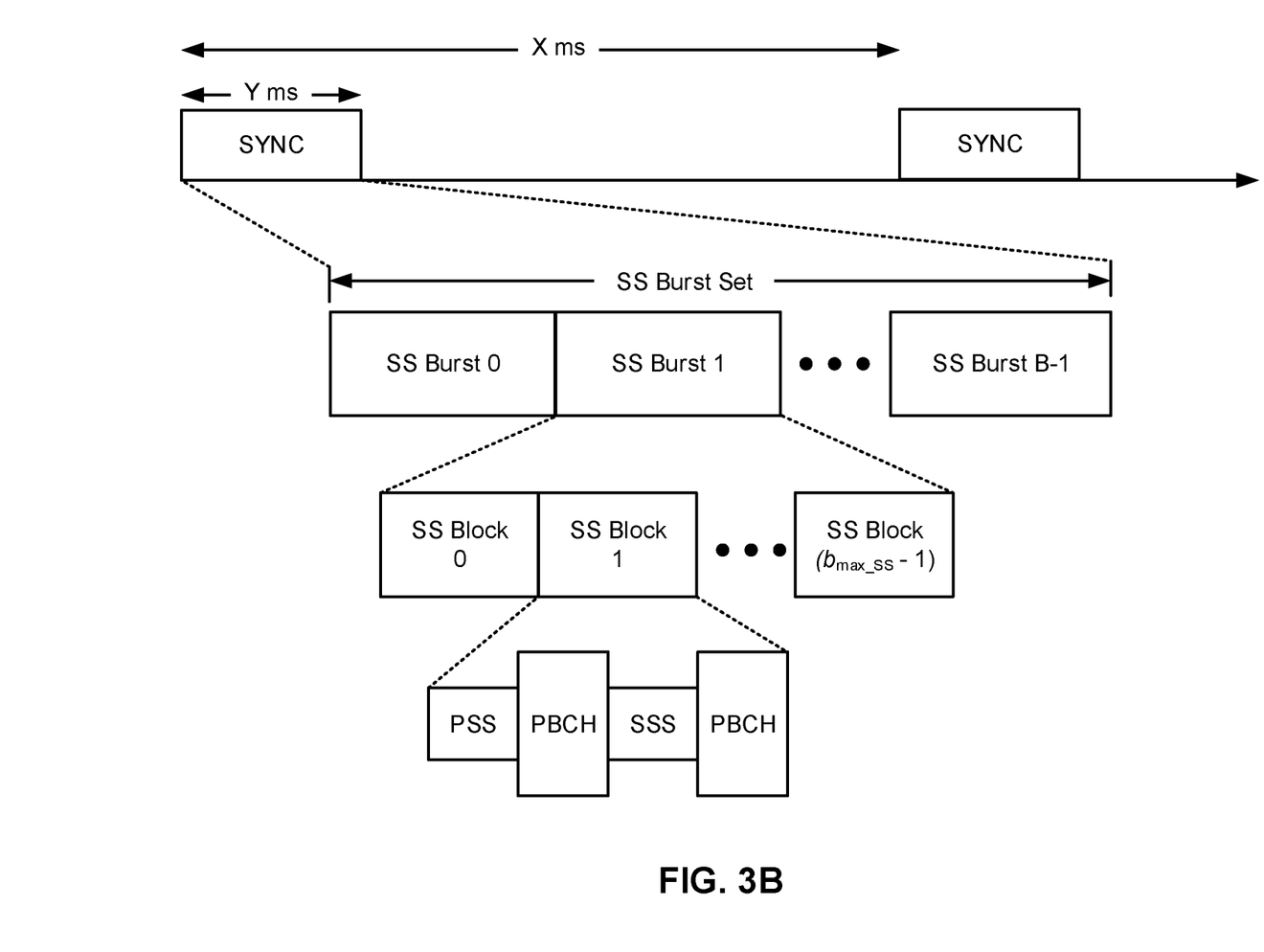
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
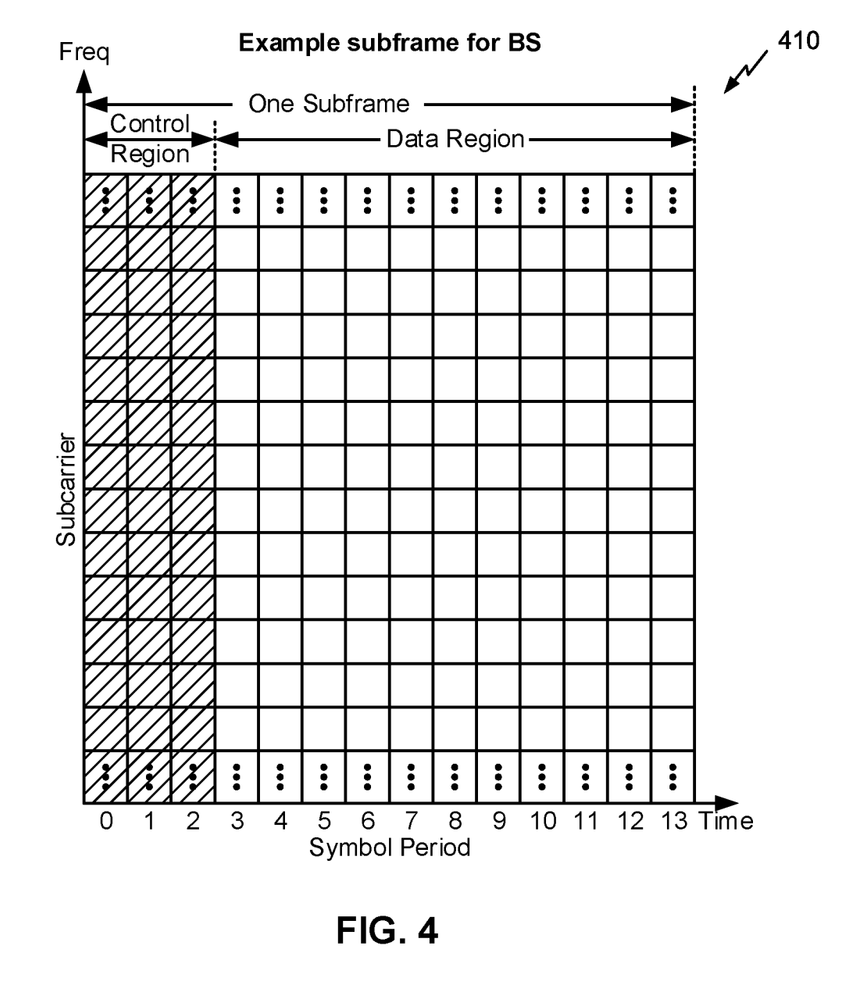
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In some wireless networks, such as a NR network, a UE may be configured with multiple power control loops in association with power control for transmitting uplink communications on a given channel (e.g., transmission of a physical uplink shared channel (PUSCH) communication, transmission of a physical uplink control channel (PUCCH) communication, transmission of a sounding reference signal (SRS), and/or the like). For example, the UE may be configured with different power control loops for different uplink communications associated with different types of services that may use a given channel (e.g., an enhanced mobile broadband (eMBB) service, an ultra-reliable low-latency communication (URLLC) service, and/or the like), for different beams that may use a given channel (e.g., when the UE has separate antenna arrays that can be simultaneously used for communication with a network and, thus, can experience different channel conditions), and/or the like.

Generally, UE power control operates based on transmit power control (TPC) commands, provided to a UE, that indicate whether the UE is to increase or reduce a transmit power (e.g., by a step size) in association with transmitting an uplink communication on a given channel. In the case of a grant-based uplink communication, the TPC command is carried in downlink control information (DCI) associated with a grant. For example, for a grant-based PUSCH communication, the UE will be provided with DCI that identifies a set of resources to be used by the UE for the PUSCH communication, as well as a TPC command associated with power control for transmitting the PUSCH communication.

However, some types of uplink communications do not use such grants, such as an uplink communication associated with a type of traffic that is periodically configured (e.g., a semi-persistent scheduling (SPS) uplink communication, a type-2 configured grant communication, a periodic channel state information (CSI) report, a periodic SRS, and/or the like). In such cases, since there is no grant corresponding to a given uplink communication, the UE is not provided with DCI and, thus, is not provided with a TPC command. However, group power control DCI may be used in order to perform UE power control for such uplink communications.

Group power control DCI includes information via which a TPC command can be provided to a UE for power control associated with transmitting an uplink communication that does not have associated DCI (e.g., an uplink communication associated with periodically or semi-persistently configured traffic).

In some cases, cyclic redundancy check (CRC) bits of the group power control DCI may be scrambled by a radio network temporary identifier (RNTI) value associated with a channel to which the group power control DCI applies. For example, a base station may scramble the CRC based on a RNTI value associated with the PUSCH (TPC-PUSCH-RNTI), a RNTI value associated with the PUCCH (TPC-PUCCH-RNTI), a RNTI value associated with SRS (TPC-SRS-RNTI), and/or the like. These RNTI values are signaled to the UE. Here, when decoding the DCI, the UE will apply the RNTI values to descramble the CRC and, when the UE applies the RNTI value based on which the CRC was scrambled, will be able to determine that the CRC is correct and, thus, can identify the channel to which the DCI applies.

Further, the group power control DCI may include multiple TPC commands, where each TPC command may be associated with a different UE. In such a case, a given UE is assigned a TPC field that carries the TPC command associated with the UE. Here, a TPC index, associated with the TPC field, is signaled to the UE, in order to allow the UE to identify the TPC for the UE. In such cases, multiple UEs may be configured with the same RNTI value, but may be signaled a different TPC index (e.g., such that the multiple UEs can get different TPC commands from the same group power control DCI).

In this way, the UE may identify a channel to which the group power control DCI applies, as well as a TPC command, of multiple TPC commands included in the group power control DCI, that is associated with the particular UE. However, in a network in which the UE can be configured with multiple power control loops for a given channel, as described above, the UE may be unable to identify the power control loop to which the TPC command is to be applied.

Some aspects described herein provide techniques and apparatuses for allowing a UE to determine a loop index associated with a TPC command carried in group power control DCI. In some aspects, the loop index may identify a power control loop, of a plurality of power control loops, to which the TPC command is to be applied. Further, techniques and apparatuses described herein provide a definition for a minimum time gap between receipt of the group power control DCI and transmission of an uplink communication to which the TPC command is applied.

Figure 5A:
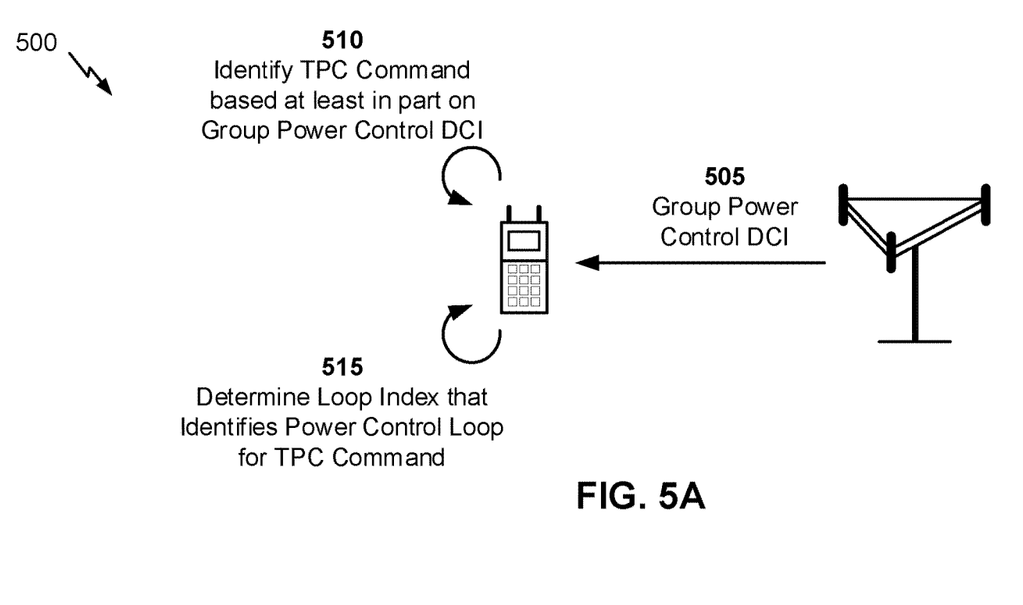
FIGS. 5A and 5B are diagrams illustrating an example of determining a loop index associated with a transmit power control (TPC) command carried in group power control downlink control information (DCI), and applying the TPC command in association with transmitting an uplink communication, in accordance with various aspects of the present disclosure.
Figure 5B:
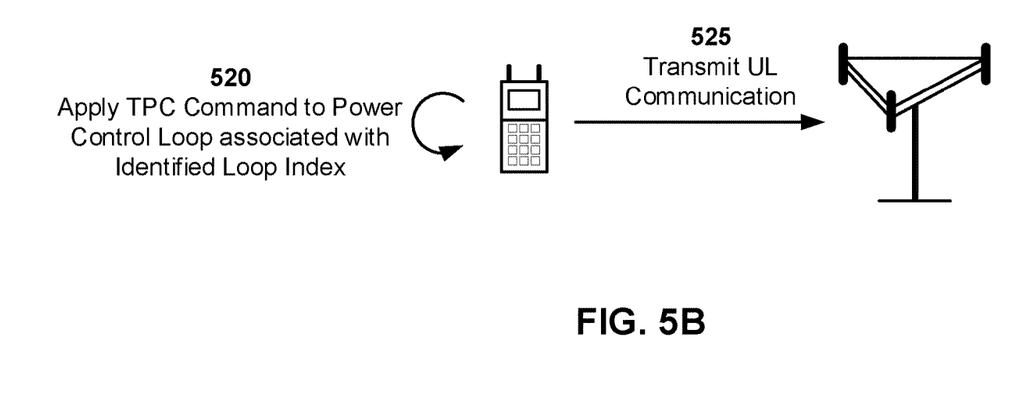

FIGS. 5A and 5B are diagrams illustrating an example 500 of determining a loop index associated with a TPC command carried in group power control DCI, and applying the TPC command in association with transmitting an uplink communication, in accordance with various aspects of the present disclosure.

As shown in FIG. 5A, and by reference number 505, a UE (e.g., UE 120) may receive group power control DCI from a base station (e.g., base station 110). In some aspects, as described above, the group power control DCI may include information via which a TPC command can be provided to the UE for power control associated with transmitting an uplink communication that does not have associated DCI (e.g., an uplink communication associated with periodically or semi-persistently configured traffic, such as a SPS uplink communication, a type-2 configured grant communication, a periodic CSI report, a periodic SRS, and/or the like).

As shown by reference number 510, the UE may identify a TPC command, associated with the UE, based at least in part on the group power control DCI. For example, the UE may be configured with one or more RNTI values, each associated with a respective channel (e.g., a TPC-PUSCH-RNTI associated with the PUSCH, a TPC-PUCCH-RNTI associated with the PUCCH, a TPC-SRS-RNTI associated with SRS, and/or the like). Further, the UE may be signaled (e.g., via radio resource control (RRC) signaling) a TPC index that identifies a location of a TPC command, associated with the UE, within the group power control DCI. Here, as described above, the UE may identify a channel to which the group power control DCI applies (e.g., based at least in part on descrambling CRC bits of the group power control DCI using one of the one or more RNTI values) and may identify the TPC command associated with the UE (e.g., based at least in part on the TPC index).

As shown by reference number 515, the UE may determine a loop index, associated with the TPC command, that identifies a power control loop, of a plurality of power control loops, for the TPC command (i.e., a power control loop to which the TPC command is to be applied).

In some aspects, the UE may determine the loop index based at least in part on a RNTI value associated with the UE. For example, the UE may be configured with information indicating that a first set of RNTI values (e.g., even-numbered RNTI values, RNTI values in a first range of values, and/or the like) is associated with a first loop index, and information indicating that a second set of RNTI values (e.g., odd-numbered RNTI values, RNTI values in a second range of values, and/or the like) is associated with a second loop index. Here, the UE may identify the TPC command based at least in part on a particular RNTI value (e.g., the TPC-PUSCH-RNTI, the TPC-PUCCH-RNTI, the TPC-SRS-RNTI, and/or the like), as described above, and may determine the loop index based at least in part on the particular RNTI value that was used to successfully decode the group power control DCI (e.g., by determining whether the particular RNTI value is an even-numbered RNTI value or an odd-numbered RNTI value, by determining whether the particular RNTI value falls within the first range of values or the second range of values, and/or the like).

In some aspects, the UE may be configured with multiple RNTI values associated with a same channel (e.g., when multiple power control loops, associated with the same channel, need group power control), and may determine the loop index based at least in part on the multiple RNTI values associated with the channel in a manner similar to that described above (e.g., based at least in part on which RNTI value resulted in successful decoding of the group power control DCI).

In some aspects, the UE may determine the loop index based at least in part on the loop index being signaled to the UE. In some aspects, the loop index may be signaled to the UE along with the TPC index. For example, the base station may signal one or more TPC indices, and one or more corresponding loop indices, to the UE (e.g., via RRC signaling).

In some aspects, the loop index may be explicitly signaled to the UE (e.g., when the loop index itself is signaled to the UE). Additionally, or alternatively, the loop index may be implicitly signaled to the UE. For example, the UE may be configured with information indicating that one or more particular TPC indices (e.g., even-numbered TPC indices, TPC indices in a first range of values, and/or the like) is associated with a first loop index, and information indicating that a second set of TPC indices (e.g., odd-numbered TPC indices, TPC indices in a second range of values, and/or the like) is associated with a second loop index. Here, the UE determine the loop index based at least in part on a particular configured TPC index (e.g., by determining whether the particular TPC index is an even-numbered value or an odd-numbered value, by determining whether the particular TPC index value falls within a first range of values or a second range of values, and/or the like).

In some aspects, the UE may determine the loop index based at least in part on one or more bits included in the group power control DCI. For example, the group power control DCI may include a set of bits, each associated with a different TPC field included in the group power control DCI (where each TPC field carries a respective TPC command). Here, a given bit, associated with a given TPC field, may identify a loop index associated with the given TPC field. In other words, a bit may be used to identify a loop index associated with a single TPC field included in the group power control DCI, in some aspects.

As another example, the group power control DCI may include a bit associated with each TPC field included in the group power control DCI. Here, the bit may identify a loop index associated with each TPC field included in the DCI. In other words, a bit may be used to identify a loop index associated with multiple (e.g., all) TPC fields included in the group power control DCI, in some aspects.

In some aspects, the UE may determine the loop index based at least in part on information indicating that the TPC command applies to each of the plurality of power control loops configured on the UE. In some aspects, such inform may be signaled to the UE by the base station (e.g., via RRC signaling).

As shown in FIG. 5B, and by reference numbers 520 and 525, the UE may apply the TPC command to the power control loop associated with the determined loop index, and may transmit an uplink communication, accordingly (e.g., at a transmit power that is controlled in accordance with the TPC command).

In some aspects, a minimum amount of time (herein referred to as a time gap) between the UE receiving the group power control DCI and the UE applying the TPC command (in association with transmitting the uplink communication) may be based at least in part on a capability value associated with the UE. The capability value may be, for example, a value associated with a minimum amount of time needed by the UE between receiving an uplink grant and transmitting an uplink communication associated with the uplink grant (e.g., a capability value associated with transmitting a PUSCH communication or a SRS associated based at least in part on an uplink grant). As another example, the capability value may be associated with a minimum amount of time needed by the UE between receiving a downlink communication and transmitting a corresponding acknowledgement (ACK) or negative acknowledgment (NACK) (e.g., a capability value associated with transmitting a PUCCH communication, such as an ACK/NACK, after receiving a downlink communication).

Additionally, or alternatively, the minimum time gap between the UE receiving the group power control DCI and the UE applying the TPC command may be based at least in part on a delay value associated with the UE. The delay value may be, for example, one of a set of delay values that indicates possible uplink scheduling delays (e.g., one of a set of values, signaled to the UE, that indicate possible uplink scheduling delays associated with transmitting a PUSCH communication or a SRS). As another example, the delay value may be one of a set of delay values that indicates possible delays associated with transmitting an ACK/NACK associated with a downlink communication.

As indicated above, FIGS. 5A and 5B are provided as examples. Other examples are possible and may differ from what was described with respect to FIGS. 5A and 5B.

Figure 6:
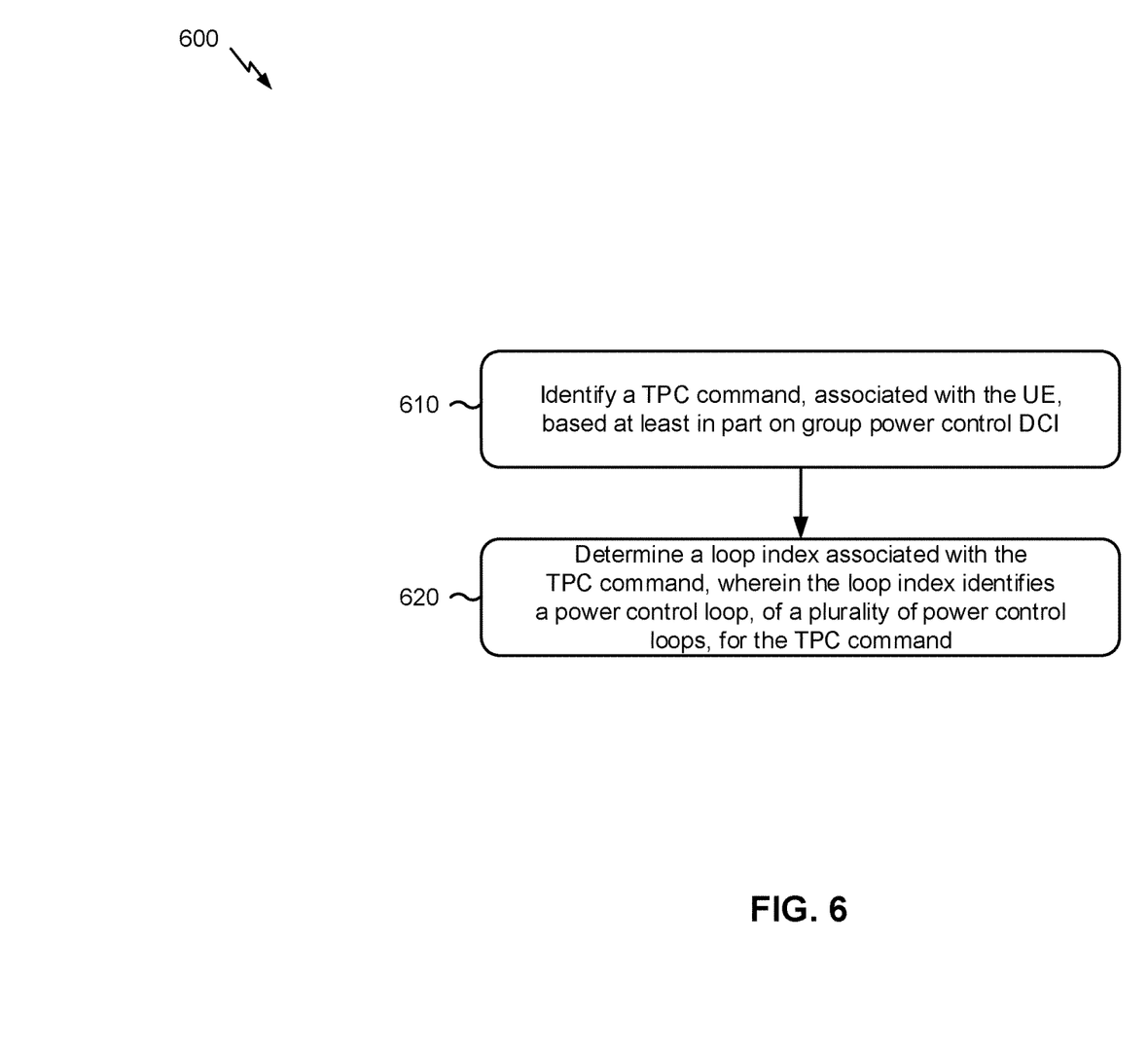
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) determines a loop index associated with a TPC command, as described herein.

As shown in FIG. 6, in some aspects, process 600 may include identifying a TPC command, associated with the UE, based at least in part on group power control DCI (block 610). For example, the UE may (e.g., using receive processor 258, controller/processor 280, transmit processor 264, and/or the like) identify a TPC command, associated with the UE, based at least in part on group power control DCI, as described above.

As shown in FIG. 6, in some aspects, process 600 may include determining a loop index associated with the TPC command, wherein the loop index identifies a power control loop, of a plurality of power control loops, for the TPC command (block 620). For example, the UE may (e.g., using receive processor 258, controller/processor 280, transmit processor 264, and/or the like) may determine a loop index associated with the TPC command, wherein the loop index identifies a power control loop, of a plurality of power control loops, for the TPC command, as described above.

Process 600 may include additional aspects, such as any single aspect or any combination of aspects described below and/or in connection with one or more other processes described elsewhere herein.

In some aspects, the loop index is determined based at least in part on a radio network temporary identifier (RNTI) value associated with the UE. In some aspects, the RNTI value is associated with physical uplink shared channel (PUSCH) transmissions. In some aspects, the RNTI value is associated with physical uplink control channel (PUCCH) transmissions. In some aspects, the RNTI value is associated with sounding reference signal (SRS) transmissions. In some aspects, the loop index is determined based at least in part on whether the RNTI value is an odd-numbered RNTI value or an even-numbered RNTI value. In some aspects, the loop index is determined based at least in part on a range of values, of a plurality of ranges of values, in which the RNTI value is included.

In some aspects, the loop index is determined based at least in part on the loop index being signaled to the UE, wherein the loop index is associated with a TPC index, associated with the TPC command, that is signaled to the UE. In some aspects, the loop index and the TPC index are signaled to the UE via radio resource control (RRC) signaling. In some aspects, the loop index is determined based at least in part on whether the TPC index is an odd-numbered value or an even-numbered value. In some aspects, the loop index is determined based at least in part on a range of values, of a plurality of ranges of values, in which the TPC index is included.

In some aspects, the loop index is determined based at least in part on a bit, included in the group power control DCI, that is associated with a single TPC field included in the group power control DCI, wherein the single TPC field includes the TPC command associated with the UE.

In some aspects, the loop index is determined based at least in part on a bit, included in the group power control DCI, that is associated with a plurality of TPC fields included in the group power control DCI, wherein the plurality of TPC fields includes a TPC field that includes the TPC command associated with the UE.

In some aspects, the loop index is determined based at least in part on information indicating that the TPC command applies to each of the plurality of power control loops.

In some aspects, the power control loop is applied in association with a semi-persistent uplink channel that does not include DCI. In some aspects, the semi-persistent uplink channel is associated with transmitting at least one of a semi-persistent scheduling (SPS) uplink communication; a type-2 configured grant communication; a periodic channel state information (CSI) report; or a periodic sounding reference signal (SRS).

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
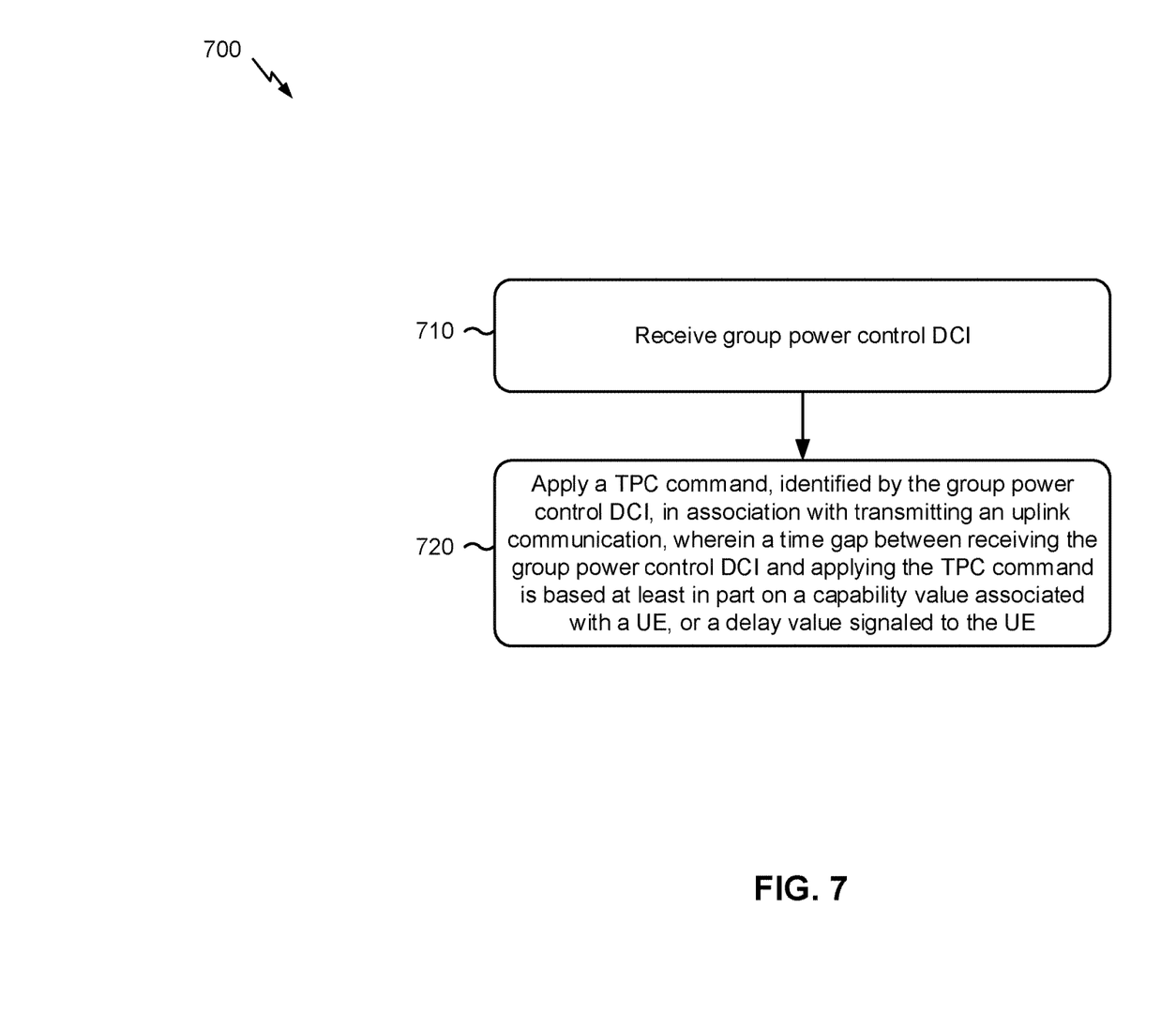
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) applies a TPC command identified by a group power control DCI.

As shown in FIG. 7, in some aspects, process 700 may include receiving group power control DCI (block 710). For example, the UE may (e.g., using antenna 252, receive processor 258, controller/processor 280, and/or the like) receive group power control DCI, as described above.

As shown in FIG. 7, in some aspects, process 700 may include applying a TPC command, identified by the group power control DCI, in association with transmitting an uplink communication, wherein a time gap between receiving the group power control DCI and applying the TPC command is based at least in part on a capability value associated with the UE, or a delay value signaled to the UE (block 720). For example, the UE may (e.g., using receive processor 258, controller/processor 280, transmit processor 264, and/or the like) apply a TPC command, identified by the group power control DCI, in association with transmitting an uplink communication, wherein a time gap between receiving the group power control DCI and applying the TPC command is based at least in part on a capability value associated with the UE, or a delay value signaled to the UE, as described above.

Process 700 may include additional aspects, such as any single aspect or any combination of aspects described below and/or in connection with one or more other processes described elsewhere herein.

In some aspects, the capability value is associated with a minimum amount of time between receiving an uplink grant and transmitting a corresponding uplink communication.

In some aspects, the delay value is one of a set of delay values that indicates possible uplink scheduling delays.

In some aspects, the capability value is associated with a minimum amount of time between receiving a downlink transmission and transmitting a corresponding acknowledgement (ACK) or negative acknowledgment (NACK).

In some aspects, the delay value is one of a set of delay values that indicate possible delays associated with transmitting an acknowledgement (ACK) or negative acknowledgment (NACK).

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a transmit power control (TPC) command, associated with the UE, based at least in part on group power control downlink control information (DCI);
    determining a loop index associated with the TPC command,
        wherein the loop index identifies a power control loop, of a plurality of power control loops, for the TPC command; and
    applying the TPC command to the power control loop based on a time gap that indicates a minimum amount of time between the UE receiving the group power control DCI and the UE applying the TPC command.

2. The method of claim 1, wherein the loop index is determined based at least in part on a bit, included in the group power control DCI, that is associated with a single TPC field included in the group power control DCI,
    wherein the single TPC field includes the TPC command associated with the UE.

3. The method of claim 1, wherein the loop index is determined based at least in part on a radio network temporary identifier (RNTI) value associated with the UE.

4. The method of claim 3, wherein the RNTI value is associated with at least one of:
    physical uplink shared channel (PUSCH) transmissions,
    physical uplink control channel (PUCCH) transmissions, or
    sounding reference signal (SRS) transmissions.

5. The method of claim 3, wherein the loop index is determined based at least in part on whether the RNTI value is an odd-numbered RNTI value or an even-numbered RNTI value.

6. The method of claim 3, wherein the loop index is determined based at least in part on a range of values, of a plurality of ranges of values, in which the RNTI value is included.

7. The method of claim 1, wherein the loop index is determined based at least in part on the loop index being signaled to the UE,
    wherein the loop index is associated with a TPC index, associated with the TPC command, that is signaled to the UE.

8. The method of claim 7, wherein the loop index and the TPC index are signaled to the UE via radio resource control (RRC) signaling.

9. The method of claim 7, wherein the loop index is determined based at least in part on whether the TPC index is an odd-numbered value or an even-numbered value.

10. The method of claim 7, wherein the loop index is determined based at least in part on a range of values, of a plurality of ranges of values, in which the TPC index is included.

11. The method of claim 1, wherein the loop index is determined based at least in part on a bit, included in the group power control DCI, that is associated with a plurality of TPC fields included in the group power control DCI,
    wherein the plurality of TPC fields includes a TPC field that includes the TPC command associated with the UE.

12. The method of claim 1, wherein the loop index is determined based at least in part on information indicating that the TPC command applies to each of the plurality of power control loops.

13. The method of claim 1, wherein the power control loop is applied in association with a semi-persistent uplink channel that does not include DCI.

14. The method of claim 13, wherein the semi-persistent uplink channel is associated with transmitting at least one of:
    a semi-persistent scheduling (SPS) uplink communication;
    a type-2 configured grant communication;

a periodic channel state information (CSI) report; or
a periodic sounding reference signal (SRS).

15. A user equipment (UE) for wireless communication, comprising:
    memory; and
    one or more processors operatively coupled to the memory, the memory and the one or more processors configured to:
        identify a transmit power control (TPC) command, associated with the UE, based at least in part on group power control downlink control information (DCI);
        determine a loop index associated with the TPC command,
            wherein the loop index identifies a power control loop, of a plurality of power control loops, for the TPC command; and
        apply the TPC command to the power control loop based on a time gap that indicates a minimum amount of time between the UE receiving the group power control DCI and the UE applying the TPC command.

16. The UE of claim 15, wherein the loop index is determined based at least in part on a bit, included in the group power control DCI, that is associated with a single TPC field included in the group power control DCI,
    wherein the single TPC field includes the TPC command associated with the UE.

17. The UE of claim 15, wherein the loop index is determined based at least in part on a radio network temporary identifier (RNTI) value associated with the UE.

18. The UE of claim 17, wherein the RNTI value is associated with at least one of:
    physical uplink shared channel (PUSCH) transmissions,
    physical uplink control channel (PUCCH) transmissions, or
    sounding reference signal (SRS) transmissions.

19. The UE of claim 17, wherein the loop index is determined based at least in part on whether the RNTI value is an odd-numbered RNTI value or an even-numbered RNTI value.

20. The UE of claim 17, wherein the loop index is determined based at least in part on a range of values, of a plurality of ranges of values, in which the RNTI value is included.

21. The UE of claim 15, wherein the loop index is determined based at least in part on the loop index being signaled to the UE,
    wherein the loop index is associated with a TPC index, associated with the TPC command, that is signaled to the UE.

22. The UE of claim 21, wherein the loop index is determined based at least in part on whether the TPC index is an odd-numbered value or an even-numbered value.

23. The UE of claim 21, wherein the loop index is determined based at least in part on a range of values, of a plurality of ranges of values, in which the TPC index is included.

24. The UE of claim 15, wherein the loop index is determined based at least in part on a bit, included in the group power control DCI, that is associated with a plurality of TPC fields included in the group power control DCI,
    wherein the plurality of TPC fields includes a TPC field that includes the TPC command associated with the UE.

25. The UE of claim 15, wherein the loop index is determined based at least in part on information indicating that the TPC command applies to each of the plurality of power control loops.

26. The UE of claim 15, wherein the power control loop is applied in association with a semi-persistent uplink channel that does not include DCI.

27. An apparatus for wireless communication, comprising:
    means for identifying a transmit power control (TPC) command, associated with the apparatus, based at least in part on group power control downlink control information (DCI);
    means for determining a loop index associated with the TPC command,
        wherein the loop index identifies a power control loop, of a plurality of power control loops, for the TPC command; and
    means for applying the TPC command to the power control loop based on a time gap that indicates a minimum amount of time between the apparatus receiving the group power control DCI and the apparatus applying the TPC command.

28. The apparatus of claim 27, wherein the loop index is determined based at least in part on a bit, included in the group power control DCI, that is associated with a single TPC field included in the group power control DCI,
    wherein the single TPC field includes the TPC command associated with the apparatus.

29. A non-transitory computer-readable medium storing instructions for wireless communication, the instructions comprising:
    one or more instructions that, when executed by one or more processors of a user equipment (UE), cause the one or more processors to:
        identify a transmit power control (TPC) command, associated with the UE, based at least in part on group power control downlink control information (DCI);
        determine a loop index associated with the TPC command,
            wherein the loop index identifies a power control loop, of a plurality of power control loops, for the TPC command; and
        apply the TPC command to the power control loop based on a time gap that indicates a minimum amount of time between the UE receiving the group power control DCI and the UE applying the TPC command.

30. The non-transitory computer-readable medium of claim 29, wherein the loop index is determined based at least in part on a bit, included in the group power control DCI, that is associated with a single TPC field included in the group power control DCI,
    wherein the single TPC field includes the TPC command associated with the UE.

* * * * *